United States Patent [19]

Immega

[11] Patent Number: 5,181,452
[45] Date of Patent: Jan. 26, 1993

[54] BELLOWS ACTUATOR

[75] Inventor: Guy Immega, Vancouver, Canada

[73] Assignee: Kinetic Sciences Inc., Vancouver, Canada

[21] Appl. No.: 796,422

[22] Filed: Nov. 22, 1991

[51] Int. Cl.[5] .................. F15B 11/08; F01B 19/00
[52] U.S. Cl. .............................. 91/418; 92/34; 92/48; 92/49; 92/90; 92/92
[58] Field of Search ............... 92/34, 35, 48, 89, 90, 92/92; 91/418

[56] References Cited

U.S. PATENT DOCUMENTS

| | | | |
|---|---|---|---|
| 2,522,401 | 9/1950 | Rava | 92/90 |
| 3,469,502 | 9/1969 | Gardner | 92/34 |
| 3,721,371 | 3/1973 | Dolveck | 92/34 X |
| 4,464,980 | 8/1984 | Yoshida | 92/34 |
| 4,939,982 | 7/1990 | Immega et al. | 92/92 |

FOREIGN PATENT DOCUMENTS

| | | | |
|---|---|---|---|
| 2320835 | 11/1974 | Fed. Rep. of Germany | 92/34 |
| 72052 | 6/1977 | Japan | 92/34 |

Primary Examiner—Edward K. Look
Assistant Examiner—John Ryznic

[57] ABSTRACT

A bellows actuator has at least one bellows chamber comprising at least three chamber segments arranged around an axis. Each of the chamber segments forms a radially outwardly extending protrusion comprising four chamber wall portions, which merge with one another along fold lines which extend peripherally and radially of the bellows chamber and converge radially outwardly to meet at radially outermost apexes of the chamber segments. The bellows actuator is expansible and contractible along the axis by flexure of the wall portions relative to one another about the fold lines in response to pressure changes within the bellows chamber.

7 Claims, 6 Drawing Sheets

BELLOWS ACTUATOR

BACKGROUND OF THE INVENTION

1. Field of the Invention

The present invention relates to bellow actuators which are expansible and contractible in response to pressure variations.

2. Description of Related Art

Prior art inflatable bellows devices include those disclosed in U.S. Pat. No. 4,464,980 issued Aug. 14, 1984 to Hideo Yoshida, for a bellows actuator blow-moulded from thermoplastic elastomeric material, U.S. Pat No. 3,469,502 issued Sep. 30, 1969 to Robert I. Garner for a flexible bellows with a nesting convolution contour and a relatively large deflection ratio, U.S. Pat. No. 3,731,595 issued May 8, 1973 to R. Wentworth Jr. for a cylindrical bellows seal for extensive axial movement U.S. Pat. No. 4,183,289 issued Jan. 15, 1980 to Takeshi Jinnouchi for a bellows apparatus with guide members restricting elongation and contraction, and U.S. Pat. No. 4,745,848 issued May 24, 1988 to Kurt Hennig for a bellows with a pleated cover and two pleated arms. All of the above-mentioned prior patents disclose variations on traditional bellow designs with circular or rectangular cross-sections.

In contrast, U.S. Pat. No. 4,939,982 issued Jul. 10, 1990 to Guy Immega and Mirko Kukolj is an axially contractible actuator designed to pull rather than push on a load.

The important characteristics of bellows actuators include pressure rating, percent elongation, elastic deformation of the membrane and axial rigidity.

Bellows with a rectangular cross-section are not generally suitable for actuators since they deform radically to a cylindrical shape under pressure.

Bellows with a circular cross-section can be made to withstand higher pressures but the percentage elongation is restricted by the need for elastomeric deformation of the bellows membrane.

Bellows with a circular cross-section which are made from metal generally can withstand greater pressure but have smaller elongation capability, unless equipped with special convolutions, as taught for example by the above-mentioned U.S. Pat. No. 3,469,502 Robert I. Garner, to allow for greater elastic deformation.

SUMMARY OF THE INVENTION

It is accordingly an object of the present invention to provide a novel and improved bellows actuator which can withstand greater pressure, for a given membrane material, but also, by reducing shear stress in the membrane, provide a greater percent extension capability than has hitherto been possible.

The present inventor has found that the shear stress in the membrane can be reduced by the adoption of a star-shaped cross-section, rather than a square or circular cross-section, thus allowing increased elongation and, if required, the use of a non-elastic, flexible material for the membrane.

According to the present invention, there is provided a bellows actuator with at least one bellows chamber, which forms a single, hollow enclosure and has at least three chamber segments arranged around the axis of the actuator. Each of the chamber segments comprises a radially outwardly extending protrusion having four chamber wall portions which merge with one another along a pair of first fold lines extending peripherally of the bellows chamber and also along a pair of second fold lines which extend radially of the bellows chamber.

The chamber wall portions of the chamber segments merge with respective ones of the wall portions of adjacent ones of the chamber segments along pairs of third fold lines which extend radially of the bellows chamber.

The first, second and third pairs of fold lines each converge radially outwardly of the bellows chamber and the pairs of fold lines meet at radially outermost apexes of the chamber segments.

The bellows actuator thus formed is expansible and contractible along the axis by flexure of the wall portions relative to one another about the first, second and third fold lines in response to pressure changes within the bellows chamber, which can be produced by a pump or other pressurized fluid source connected to the bellows chamber.

Axial stiffness of the bellows actuator is maintained through the characteristic of decreasing bladder volume as the actuator is deflected laterally.

The bellows chamber may be one of a plurality of such chambers arranged in succession along the actuator and having interiors which communicate to form a single hollow enclosure or, alternatively, multiple hollow enclosures. The segments of the successive chambers may have the same or different dimensions.

BRIEF DESCRIPTION OF THE DRAWINGS

Further objects, features and advantages of the present invention will become more readily apparent t those skilled in the art from the following description of the invention when taken in conjunction with the accompanying drawings, in which.

DESCRIPTION OF THE PREFERRED EMBODIMENT

Figure 1:
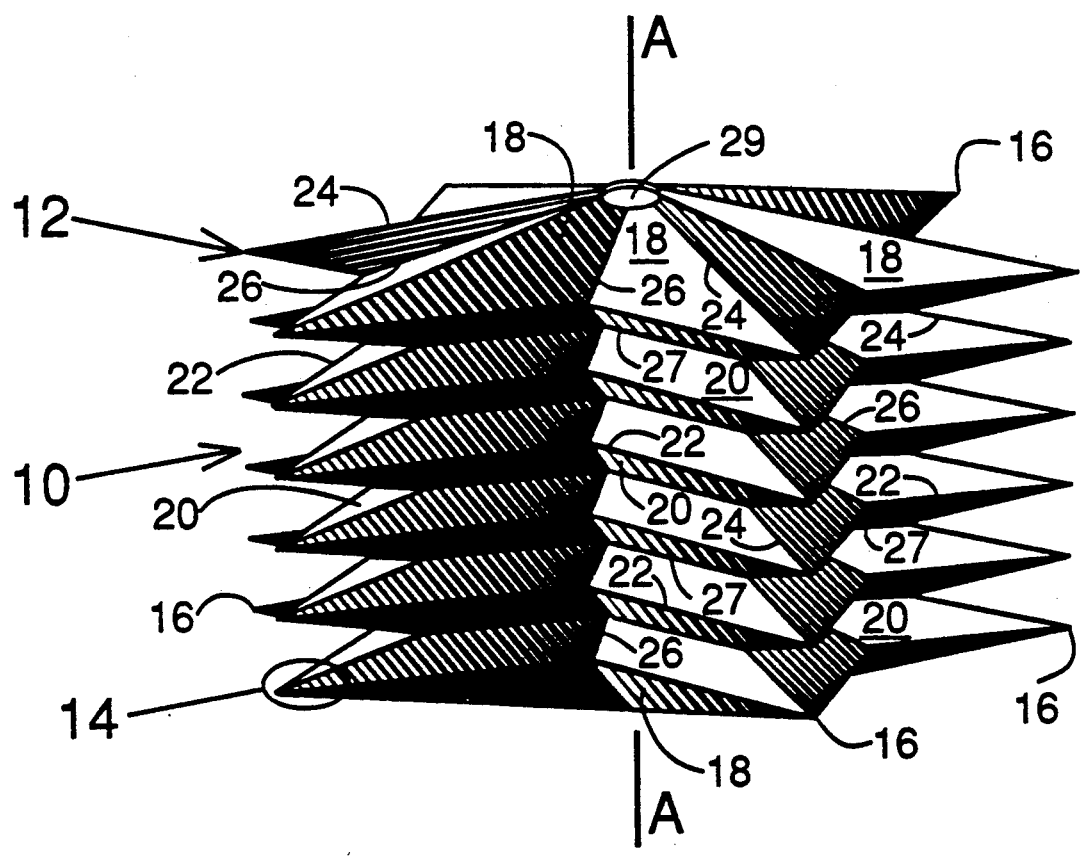
FIG. 1 shows a view in perspective of a bellows forming part of an actuator according to a first embodiment of the present invention in a contracted state.
Figure 4:
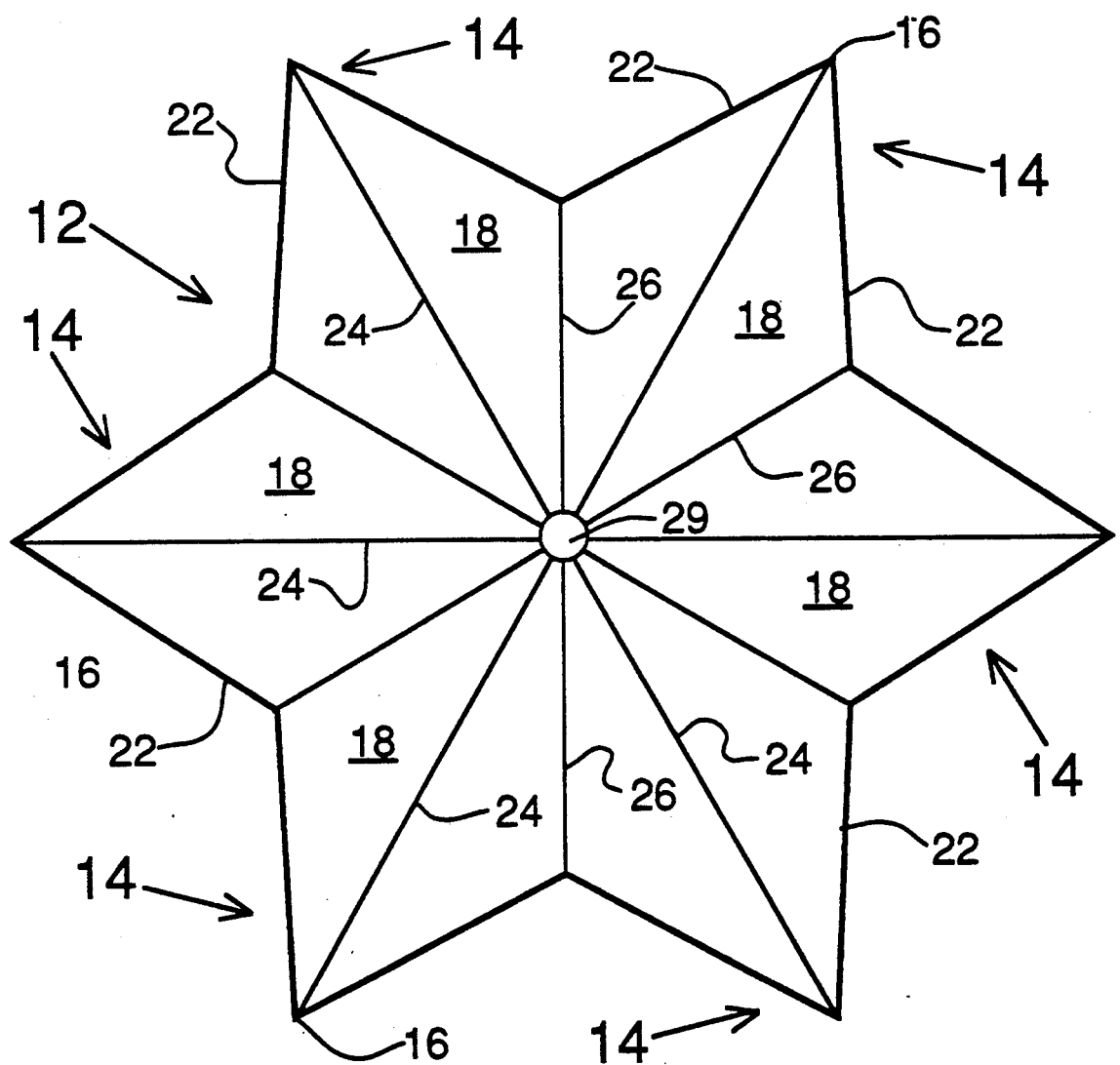
FIG. 4 shows a plan view of the bellows of FIGS. 1 through 3 and FIG. 5.

As shown in FIG. 1 of the accompanying drawings, a bellows indicated generally by reference numeral 10 has six bellows chambers, one of which is shown in FIG. 4 and indicated generally by reference numeral 12, arranged adjacent one another and in succession along the longitudinal axis A of the bellows 10, as shown in FIG. 1. Although the drawings show six chambers along axis A, any number of chambers can be configured along axis A, depending on the length of actuator required. The chambers along axis A form a single hollow enclosure or, alternatively, multiple hollow enclosures.

Each bellows chamber 12 in the present embodiment of the invention is formed of six chamber segments indicated generally by reference numeral 14 and most clearly apparent in FIG. 4, which are arranged around a longitudinal axis A of the bellows 10.

Each chamber segment 14 forms a radially outwardly extending protrusion tapering outwardly to an apex 16 and as can be seen, in particular in FIG. 4, the six chamber segments 14 form a star-shaped array about the axis A.

The chamber segments 14 at opposite ends of the actuator each have two substantially triangular wall portions 18, facing longitudinally outwardly from the bellows 10, and a second pair of wall portions 20, which are quadrilateral.

The remainder of the chamber segments 12 are each formed by two pairs of the quadrilateral wall portions 20.

The wall portions 18 and 20 are portions of a bellows wall or bladder forming the bellows 10 and made, in the present embodiment of the invention, of woven fibers of Kevlar or Nylon or other flexible fibre bonded with rubber or plastic material to form an impermeable membrane which can accommodate fluid pressure from a gaseous or liquid medium. Ideally, the bladder membrane should be flexible and impermeable but with little or no elastomeric stretch.

In each chamber segment, the wall portions 20, or 18 and 20, as the case may be, merge with one another along first fold lines 22 which extend peripherally around each of the chambers 12 and form a six-pointed star-shaped periphery, as shown in FIG. 4. Thus, each of the chamber segments 14 has a pair of the first fold lines 22 converging outwardly to the respective apex 16.

The wall portions 20, or 18 or 20, of each chamber segment 14 also merge along upper and lower second fold lines 24, which extend radially outwardly. Each chamber segment 14 has two fold lines 24, in a plane containing the axis A, which converge radially outwardly to the respective apex 16.

It will be apparent from consideration of the drawings that each chamber segment 14 is of convex polyhedral shape. The wall portions 20 of each chamber 12 merge with those of the adjacent chamber segments along radially extending third fold lines 26.

The wall portions 20 of each chamber 12 also merge with those of the adjacent chamber or chambers 12 along fourth fold lines 27 (FIG. 3), which are parallel to, and spaced radially inwardly from, respective ones of the first fold lines 22.

The first and fourth fold lines 22 and 27 lie in planes which are perpendicular to the axis A.

Figure 2:
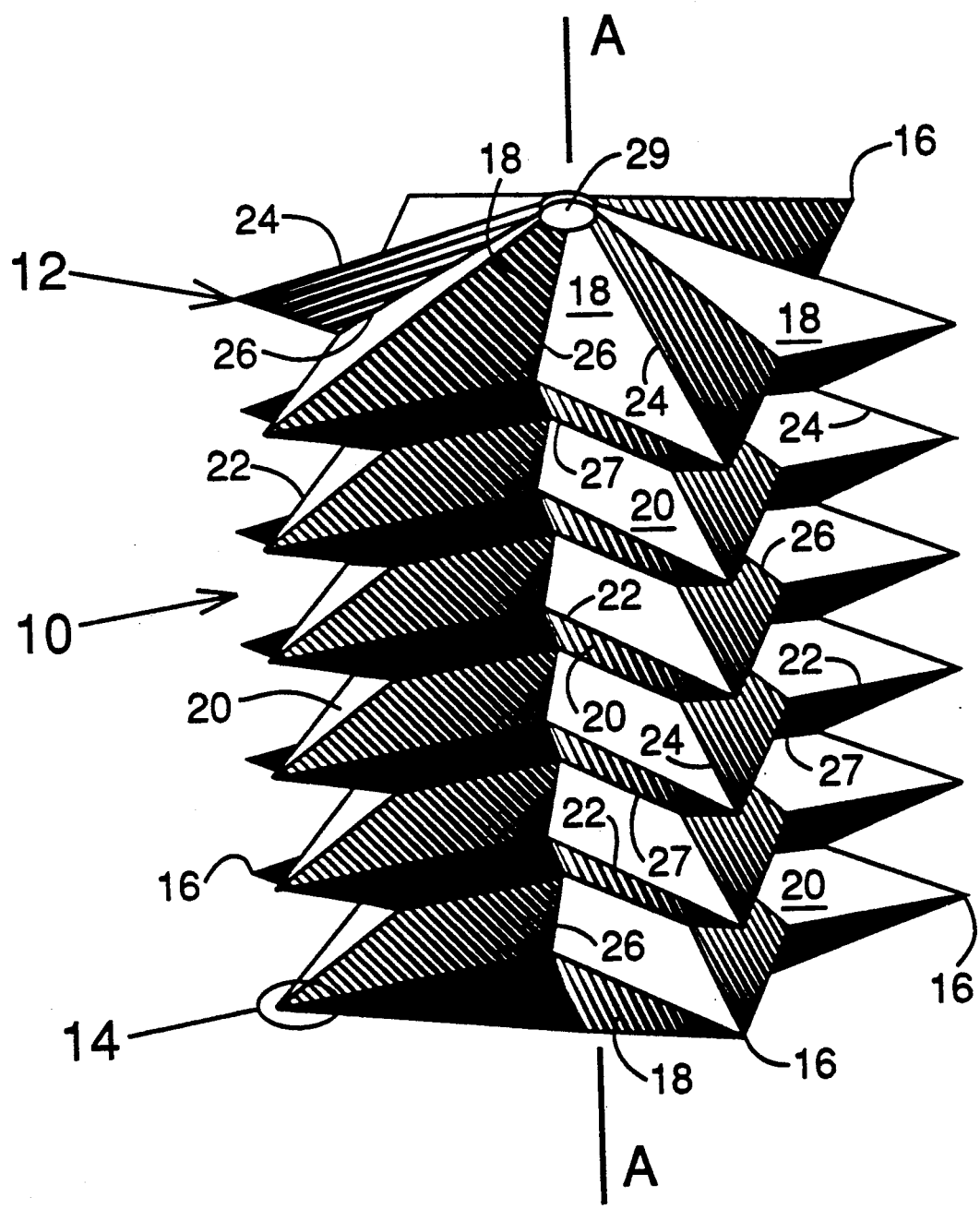
FIG. 2 shows a view similar to that of FIG. 1, but with the bellows in an expanded condition.

FIG. 1 shows the bellows in a partially collapsed condition, whereas FIG. 2 shows the bellows 10 in an expanded condition.

The expansion of the bellows 10 is effected by supplying pressurized fluid to the interior of the bellows through a nipple 28 inserted into an opening 29 formed in one end of the bellows 10.

As the bellows 10 expands longitudinally, from the contracted state shown in FIG. 1 to the extended or expanded state shown in FIG. 2, the wall portions 18 and 20 unfold somewhat about the fold lines 22, 24, 26 and 27. As this occurs, the volume of the interior of the bellows 10 increases, without requiring elastic deformation or buckling of the wall of the bellows, and the circumference of the bellows 10 decreases.

In practice, when fluid under pressure is admitted to the interior of the bellows 10, the flexible membrane forming the wall portions 18 and 20 will tend to bulge convexly, somewhat distorting the geometry of the bellows 10. However, this bulging distortion does not affect the basic folding articulation action of the wall portions 18 and 20 about the fold lines 22, 24, 26 and 27 as the bellows 10 elongates.

Figure 3:
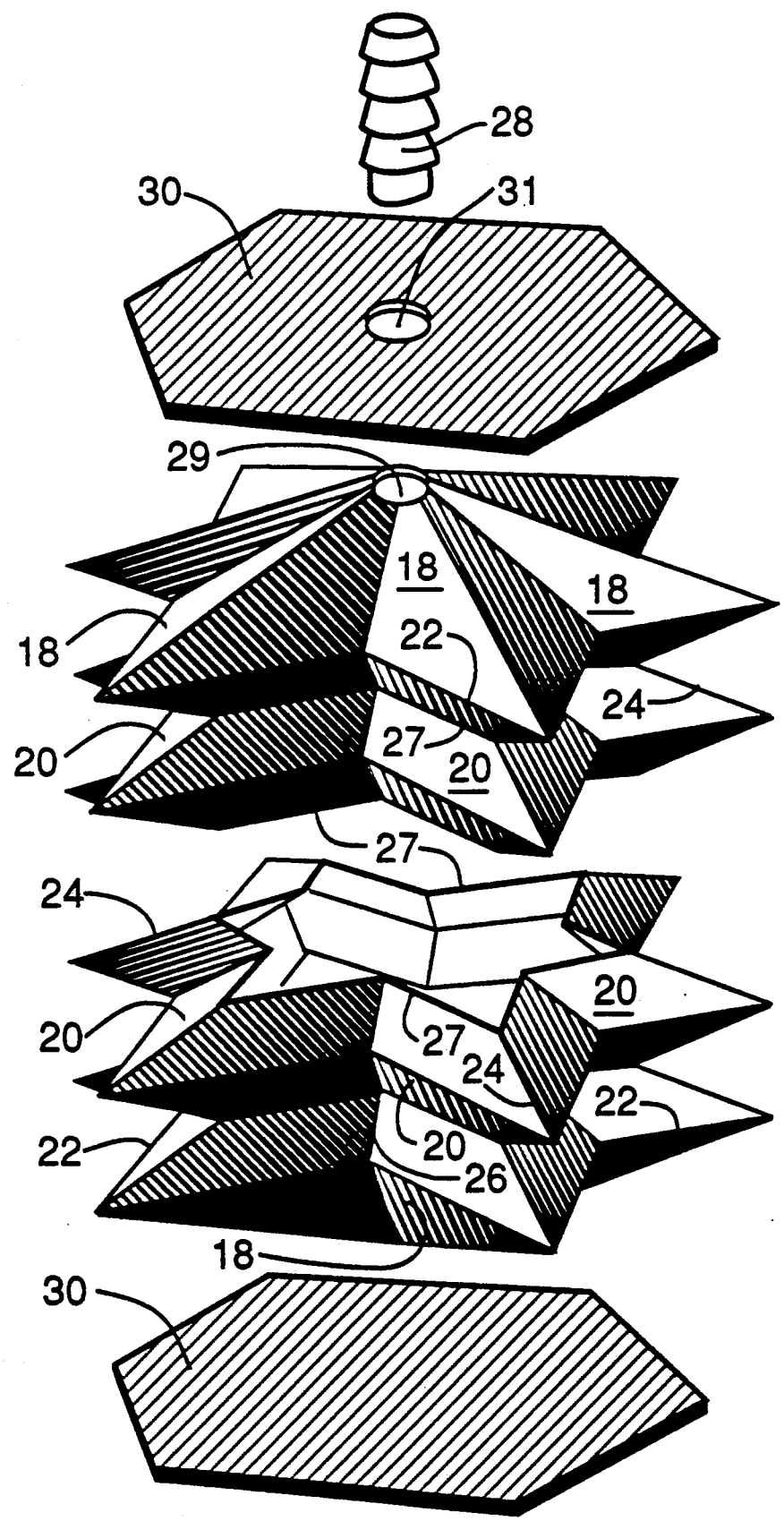
FIG. 3 shows a view corresponding to that of FIG. 3, but with parts of the expanded bellows omitted to show the interior and with other parts of the actuator illustrated in an exploded manner.

In FIG. 3, two of the chambers 12 have been omitted to show the hollow interior of the bellows and also to show the shapes of the fourth fold lines 27.

Hexagonal pressure plates 30 at opposite ends of the bellows are located adjacent the longitudinally outwardly facing sides, formed by the wall portions 18, of the endmost ones of the chambers 12 and serve to transmit force from the latter on extension of the bellows 12. In the preferred embodiment, the upper pressure plate 30 has a hole 31 for receiving the nipple 28. The pressure plates 30 need not be hexagonal, but may be any surface onto which the actuator may exert pushing force. Aperture 29 may also be located anywhere on bladder surfaces 18 or 20, rather than at the end of the bellows.

For optimum extensibility with minimum shear stress in the membrane of the bellows 10, there is an optimum ratio of the lengths of the third and second fold lines 26 and 24. This ratio equals the length of third fold line 26 divided by the length of second fold line 24.

More particularly, for the six pointed embodiment shown in FIGS. 1 through 6, the optimum ratio of the length of the fold lines 26 and 24 is the dimensionless number 0.61, approximately.

Ratios varying from the optimum will work well also, but with reduced axial extensibility of the actuator and increased shear stress in the member, requiring the membrane to be more elastic and therefore causing the membrane to be less strong.

Star-shaped patterns with other than the six pointed configuration shown in FIGS. 1 through 6 also work well. Thus, specific shapes with three or more points work well. Depending on the number of points in the star, there is a specific preferred embodiment for the dimensionless ratio of the lengths of the fold lines 26 and 24. Table 1 below provides samples of the approximate preferred ratios for star-shaped patterns with various number of points, derived by experimentation:

TABLE 1.

| Number of Points | Ratio |
| --- | --- |
| 3 | .3 |
| 4 | .45 |
| 5 | .545 |
| 6 | .61 |
| 7 | .66 |
| 8 | .7 |
| 9 | .745 |
| 10 | .75 |
| 11 | .78 |
| 12 | .8 |
| 13 | .814 |
| 14 | .827 |
| 15 | .833 |
| 16 | .84 |
| 17 | .848 |
| 18 | .856 |
| 19 | .863 |
| 20 | .87 |
| 30 | .912 |
| 40 | .935 |
| 60 | .955 |
| 80 | .965 |
| 100 | .973 |
| 200 | .986 |

Figure 5:
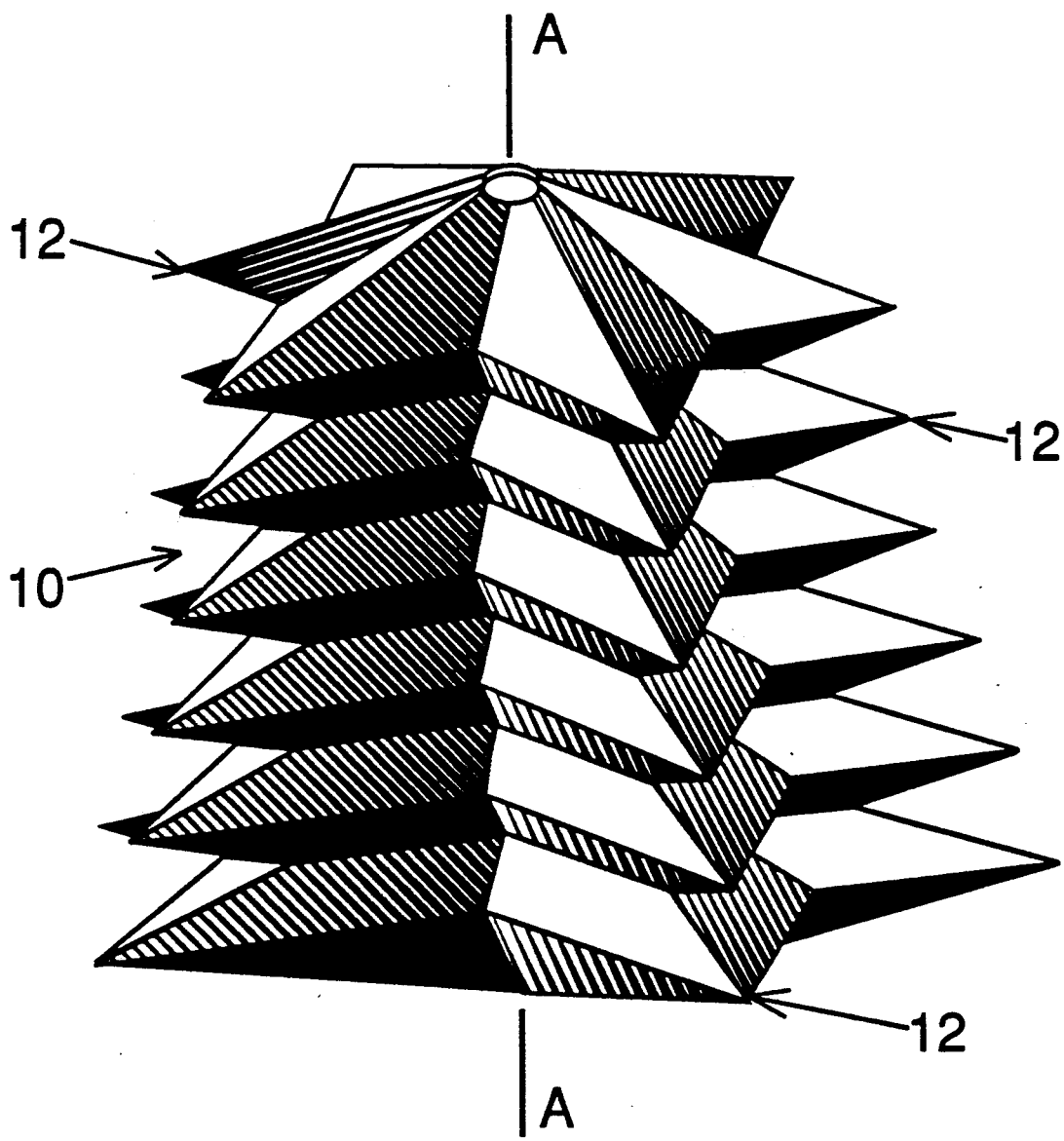
FIG. 5 shows a view similar to that of FIG. 2, but with the actuator bellows tapered along its length.

In contrast to the extended actuator shown in FIG. 2, FIG. 5 shows an extended actuator with chambers 12 along axis A which are similar but successively different in size, providing tapered actuator bladder 10. Actuators with chambers varying in size in any manner can be arrayed along axis A.

Figure 6:
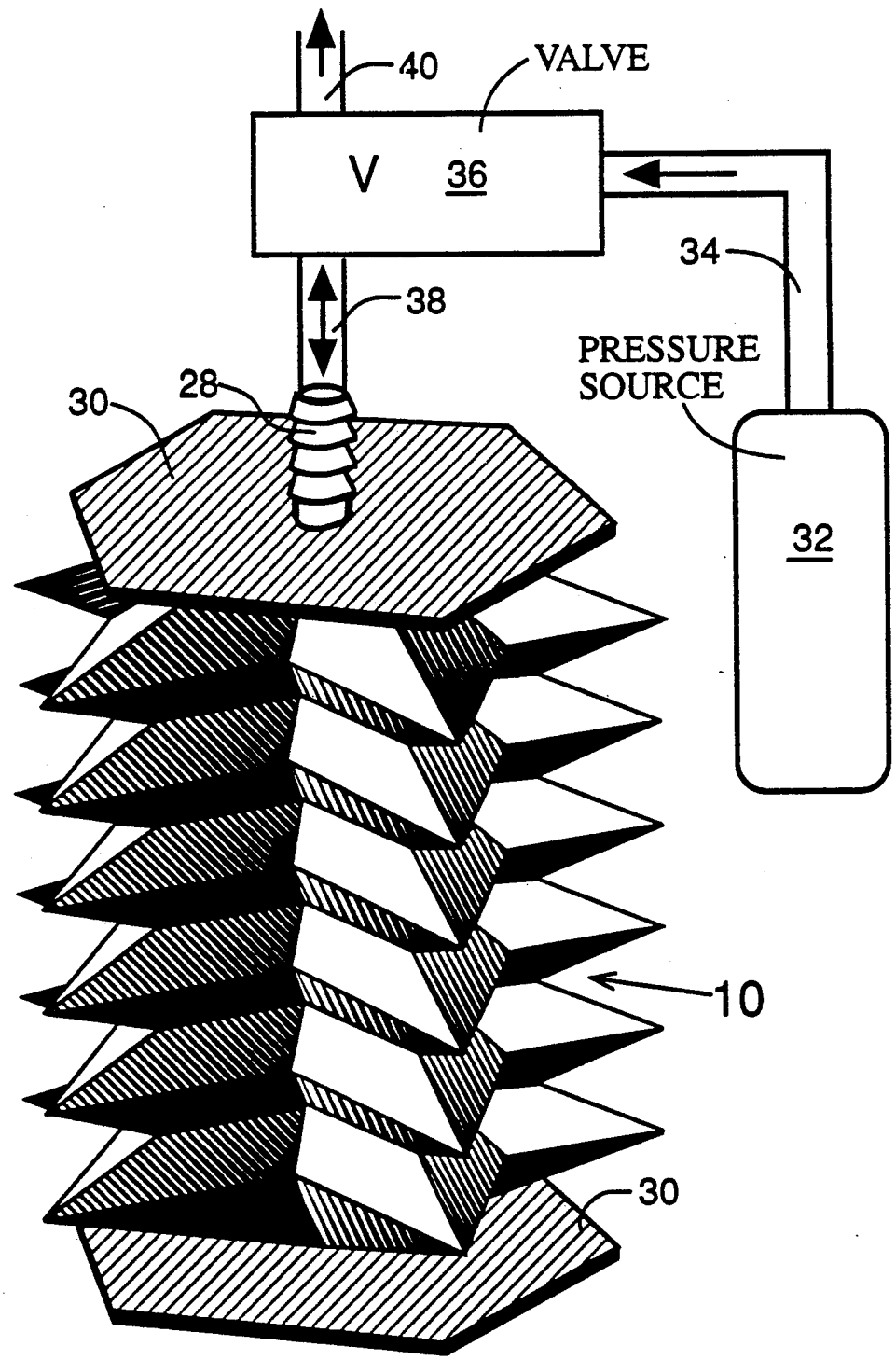
FIG. 6 shows a view in perspective of the complete bellows actuator with source of pressurized fluid and controlling valve.

FIG. 6 shows a complete bellows actuator including the bellows 10, the end plates 30 and the nipple 28. In addition, FIG. 6 shows a source of fluid pressure 32, a tube 34 connecting the fluid pressure source 32 to a fluid valve 36, a tube 38 connecting the valve 36 to nipple 38, and a fluid exhaust tube 40.

To cause the actuator bellows to expand in length, the valve 36 directs pressurized fluid from the source 32 to the nipple 28, thereby passing pressurized fluid into the hollow enclosure of bellows 10.

The cause the bellows actuator to contract in length, the valve 36 shuts off fluid flow from the pressure source 32 and directs pressurized fluid from the enclosure of the bellows 10 to the exhaust tube 40.

Other pressure and valve schemes will be obvious to those skilled in the art of pneumatics of hydraulics.

A theoretical examination of the present actuator involves an energy analysis. An energy analysis can equate the work done by the fluid in the interior of the bellows 10 to the work done by the expanding actuator on its pressure plates 30 because of the minimal elastic strain energy accompanying polyhedra articulation. Thus, the force on a load attached to the pressure plates 30 is given by the following:

$$Fa = -P\, dV/dL$$

where:
- $V$ = volume of the enclosure;
- $L$ = length of the enclosure;
- $P$ = fluid pressure in the enclosure.

On the basis of the above analysis, force verses expansion, maximum expansion, etc., can be determined by computing the geometrical behaviour of the articulating bellows 10 as it elongates.

Articulation with minimal deformation can also be ensured by testing specific bellows designs, which embody the present invention, by computing geometrical behaviour. Generally, somewhat larger forces are achieved at the beginning of elongation, diminishing as the actuator elongates and dropping to zero as the actuator bellows reaches is maximum volume state.

By appropriate choice of the number of segments per chamber (i.e. the number of star points), the ratio of the third and second fold line lengths 26 and 24 and the number of chambers 12, and also the taper between the segments, one can tailor specific aspects of actuator behaviour, such as maximum expansion, magnitude of axial force and radial size, exhibiting a versatility which distinguishes the present actuator for prior art bellows actuators. Specific designs can be obtained which exhibit greater than 250% maximum extension.

As will be apparent to those skilled in the art, various other modifications of the present invention may be made within the scope of the invention as defined in the appended claims.

I claim:

1. A bellows actuator, comprising:
   at least one bellows chamber;
   said bellows chamber comprising at least one hollow enclosure;
   said bellows chamber comprising three or more chamber segments arranged around an axis;
   each of said chamber segments comprising a radially outwardly extending protrusion;
   said protrusion comprising four chamber wall portions;
   said four chamber wall portions merging with one another along a pair of first fold lines which extend peripherally of said bellows chamber and a pair of second fold lines which extend radially of said bellows chamber;
   said chamber wall portions of each of said chamber segments merging with respective ones of said wall portions of adjacent ones of said chamber segments along pairs of third fold lines which extend radially of said bellows chamber;
   said chamber wall portions of each of said chambers merging with said chamber wall portions of adjacent chambers along pairs of fourth fold lines;
   said pairs of fold lines each converging radially outwardly; and
   said first, second and third pairs of fold lines meeting at radially outermost apexes of said chamber segments;
   said bellows actuator being expansible and contractible along the axis by flexure of said wall portions relative to one another about said first, second, third and fourth fold lines in response to pressure changes within said bellows chamber; and
   means for effecting such pressure changes.

2. A bellows actuator as claimed in claim 1, wherein said bellows chamber has six of said chamber segments arranged in a star-shaped array around the axis.

3. A bellows actuator, comprising:
   a plurality of bellows chambers located in succession along said bellows actuator and communicating with one another;
   said bellows chambers each comprising at least three chamber segments arranged around an axis;
   each of said chamber segments comprising a radially outwardly extending protrusion;
   aid protrusion comprising four chamber wall portions;
   said four chamber wall portions merging with one another along a pair of first fold lines which extend peripherally of said bellows chamber and a pair of second fold lines which extend radially of said bellows chamber;
   said chamber wall portions of each of said chamber segments merging with respective ones of said wall portions of adjacent ones of said chamber segments along pairs of third fold lines which extend radially of said bellows chamber;
   said pairs of fold lines each converging radially outwardly of said bellows chamber; and
   said pairs of fold lines meeting at radially outermost apexes of said chamber segments;
   said bellows actuator being expansible and contractible along the axis by flexure of said wall portions relative to one another about said first, second and third fold lines in response to pressure changes within said bellows chamber; and
   means for effecting such pressure changes.

4. A bellows actuator as claimed in claim 3, wherein said wall portions of adjacent ones of said bellows chambers merge along fourth fold lines, which are parallel to and spaced inwardly of respective ones of said first fold lines.

5. A bellows actuator as claimed in claim 3, wherein said chamber segments of successive ones of said bellows chambers are of different dimensions.

6. A bellows actuator as claimed in claim 3, further comprising a pressure plate at one or both ends of said bellows actuator, each said pressure plate facing and being located adjacent to one axial end of said bellows actuator for transmitting force from said bellows actuator on expansion of the latter.

7. A bellows actuator as claimed in claim 3, wherein said means for effecting the pressure change include a source of pressurized fluid, a valve for regulating the flow of pressurized fluid, and connector means on said actuator for connecting the interiors of said bellows chambers to said pressurized fluid source.

* * * * *